US00RE40325E

(19) United States
(12) Reissued Patent
Tsai et al.

(10) Patent Number: US RE40,325 E
(45) Date of Reissued Patent: May 20, 2008

(54) DEVICE AND METHOD FOR REPEATEDLY UPDATING THE FUNCTION OF A MONITOR

(75) Inventors: Te-Hsiu Tsai, Taipei (TW); Chiao-Yen Tai, Hsinchu (TW)

(73) Assignee: Novatek Microelectronics Corp., Hsinchu (TW)

(21) Appl. No.: 11/299,238
(22) Filed: Dec. 9, 2005

Related U.S. Patent Documents

Reissue of:
(64) Patent No.: 6,661,411
Issued: Dec. 9, 2003
Appl. No.: 09/575,890
Filed: May 22, 2000

U.S. Applications:
(63) Continuation of application No. 09/414,251, filed on Oct. 7, 1999, now Pat. No. 6,295,053.

(30) Foreign Application Priority Data

Jul. 19, 1999 (TW) ..... 88112204

(51) Int. Cl.
*G09G 5/00* (2006.01)

(52) U.S. Cl. ..... 345/204; 345/10; 345/213; 345/214; 345/520; 361/683

(58) Field of Classification Search ..... 345/204, 345/10, 520, 28, 213, 214; 710/38, 313, 305; 348/184, 192; 361/683, 684, 686
See application file for complete search history.

(56) References Cited

U.S. PATENT DOCUMENTS

| | | | | |
|---|---|---|---|---|
| 5,784,649 | A | 7/1998 | Begur et al. | 395/872 |
| 5,822,553 | A | 10/1998 | Gifford et al. | 395/309 |
| 5,835,761 | A | 11/1998 | Ishii et al. | 395/653 |
| 6,137,243 | A | 10/2000 | Fujimori et al. | 315/370 |
| 6,138,240 | A | 10/2000 | Tran et al. | 713/202 |
| 6,141,489 | A | 10/2000 | Honda | 386/95 |
| 6,268,845 | B1 | 7/2001 | Pariza et al. | 345/112 |
| 6,289,466 | B1 | 9/2001 | Bayramoglu et al. | 713/310 |
| 6,295,053 | B1 | 9/2001 | Tsai et al. | 345/204 |
| 6,339,819 | B1 | 1/2002 | Huppenthal et al. | 712/16 |

*Primary Examiner*—Richard Hjerpe
*Assistant Examiner*—Abbas Abdulselam
(74) *Attorney, Agent, or Firm*—J.C. Patents

(57) ABSTRACT

A device and a method for updating the function of a monitor according to the invention. By using the USB signal lines directly for data transmission and recording the data of a monitor controller to the erasable programmable read only memory, data update can be achieved. Moreover, the erasable programmable read only memory can be updated by separating the recording path and the normal visual path using a recording path separator of the monitor controller. Compared to the prior art, the device and the method of the invention are more convenient and time saving for function update of the monitor.

39 Claims, 6 Drawing Sheets

DEVICE AND METHOD FOR REPEATEDLY UPDATING THE FUNCTION OF A MONITOR

Matter enclosed in heavy brackets [ ] appears in the original patent but forms no part of this reissue specification; matter printed in italics indicates the additions made by reissue.

CROSS REFERENCE

This application is a continuation application of, and claims the priority benefit of, U.S. application Ser. No. 09/414,251 filed on Oct. 7, 1999, now U.S. Pat. No. 6,295,053.

BACKGROUND OF THE INVENTION

1. Field of the Invention

The invention relates to a device and a method for repeatedly updating the function of a monitor, and more particularly to a device and a method for repeatedly updating the function of a monitor by using universal serial bus signal lines for signal transmission.

2. Description of the Related Art

In a current monitor system, a monitor controller must be exchanged when function modifying or debugging, resulting in high cost consumed. As to a further advanced monitor system, a corresponding monitor controller has a build-in read only memory (ROM) which is an erasable programmable read only memory. By updating data stored in the erasable programmable read only memory, function modification and debugging can be achieved.

Referring to FIG. 1, a conventional monitor is shown. The monitor has a total of 18 VGA signal lines electrically coupled to a VGA card, which includes a vertical synchronous signal (Vsync) line, a horizontal synchronous signal (Hsync) line, a serial data (SDA) line, a serial clock (SCL) line, a ground (Gnd) line, a red (R) line, a green (G) line and a blue (B) line. During a normal operation, a monitor controller 10 having a ROM is electrically coupled to a horizontal and vertical deflection device 20 via a first jumper 14 and to an on screen display 50 via a second jumper 16. The monitor controller 10 is electrically coupled to the a voltage source (5 V) via a power supply jumper 12. The Hsync, Vsync, SDA, SCL and Gnd signal lines are electrically coupled to the monitor controller 10 for driving the horizontal and vertical deflection device 20 according to a received signal and a program stored in the ROM and further controlling a vertical booster (Vert. Booster) 30 and a horizontal booster (Hori. Booster) 40 for CRT horizontal and vertical controls. A on screen display driving circuit 50 is used to put control ICON to a video pre-amplifier 60. After that, the R, G, B signals are transmitted to a video amplifier 70 from the video pre-amplifier 60 and then displayed on a display (not shown).

When it is necessary to modify the function of the monitor system, data stored in the ROM of the monitor controller 10 needs to be updated. First, the case of the monitor must be opened. Then, the first jumper 14 and the second jumper 16 are switched to electrically connect the monitor controller 10 to a recording connector 80 and a voltage source (12 V). Next, a ROM writer (not shown) is electrically coupled to the recording connector 80 for data update.

Referring now to FIG. 2, a conventional system being able to update the function of a monitor is shown. After opening the case of a monitor 100, the recording connector 80 and the VGA signal line 18 can be found on a printed circuit board 110. The first jumper 14, the second jumper 16 and the power supply jumper 12 which can be found on a jumper region 22 are switched. In a memory recording system 90, a ROM writer 92 is controlled by a computer 94 and a display 96 is used to monitor the condition of recording. Finally, the ROM writer 92 is electrically coupled to the recording connector 80 for recording the ROM of the monitor controller 10 using the computer 94 thereby to update the monitor system.

Obviously, it is really inconvenient to update the monitor system because the case of the conventional monitor must be opened, first and then jumpers are switched for recording the erasable programmable read only memory of the monitor controller 10.

Today, monitors have been speedily developed. Especially, liquid crystal displays have been mass produced. To increase the speeds of the operation of monitors, universal serial bus (hereinafter, referred to as USB) is used for signal transmission. Referring to FIG. 3, a block circuit diagram of a monitor system having USB signal lines is shown. In addition to conventional VGA signal lines 18, USB signal lines 19 are further used to replace serial data and serial clock signals on the VGA signal lines 18. The USB signal lines 19 includes a power source Vcc, a ground Gnd and two data signal lines D+, D−. The data signal lines D+, D− are used to transmit monitor command data. The speed of the USB can be increased up to 1.2 M Bps. As a result, the speed of the operation of the monitor can be greatly increased.

Similarly, it causes inconvenience when the monitor system is updated because it is necessary to open the case of the monitor and to switch jumpers for recording the erasable programmable read only memory of the monitor controller 10.

SUMMARY OF THE INVENTION

The invention is to provide a device and a method for updating the function of a monitor. For a monitor having a USB interface, a USB signal line is used to transmit and record data of a monitor controller to erasable programming read only memory thereby to achieve data update.

A device for updating the function of a monitor according to the invention includes USB signal lines, a detecting device, a starting device, a ROM recording command decoder, a ROM and a recovery device. The USB signal lines is used to transmit a recording command and recorded data. The detecting device is electrically coupled to the USB signal lines for detecting and outputting the recording command and the recorded data. The starting device is electrically coupled to the detecting device for receiving the recording command and the recorded data and then transmitting the recording command and the recorded data when the starting device is switched from a visual path to a recording path. The ROM recording command decoder is used to convert the recording command into a erase/read/write signal and the recorded data into a address signal and a data signal by switching the starting device to the recording path. The ROM is electrically connected to the ROM recording command decoder, of which data can be updated according to the address signal, the data signal and the erase/read/write signal. The recovery device is electrically coupled to the ROM recording command decoder and the starting device for determining whether the data stored in the ROM are already updated according the address signal, the data signal and the read/write signal and for switching the starting device from the recording path to the visual path when the data of the ROM are already updated.

A system for updating the function of a monitor according to the invention includes a recording device, USB signal lines and a monitor controller. The recording device is used to store and output a recording command and recorded data. The USB signal lines are electrically coupled to the recording device for transmitting the recording command and the recorded data. The monitor controller having a monitor in-system programming memory is electrically coupled to the USB signal lines, for modifying the monitor controller according to the recording command and the recorded data.

A method for updating the function of a monitor according to the invention includes the following steps: (a) checking USB multi-setting command check to determine whether the signals on the USB signal lines are correct? (b) setting the monitor into a monitor in-system programming mode? (c) reading and determining a recording command; and (d) reading recorded data and writing the recorded data in a memory and performing step (c) when the recording command is a write command; (e) performing step (a) when the recording command is in a non-monitor in-system programming mode.

BRIEF DESCRIPTION OF THE DRAWINGS

The invention will become more fully understood from the detailed description given hereinafter and the accompanying drawings which are given by way of illustration only, and thus do not limit the present invention, and wherein.

DETAILED DESCRIPTION OF THE PREFERRED EMBODIMENTS

Figure 4:
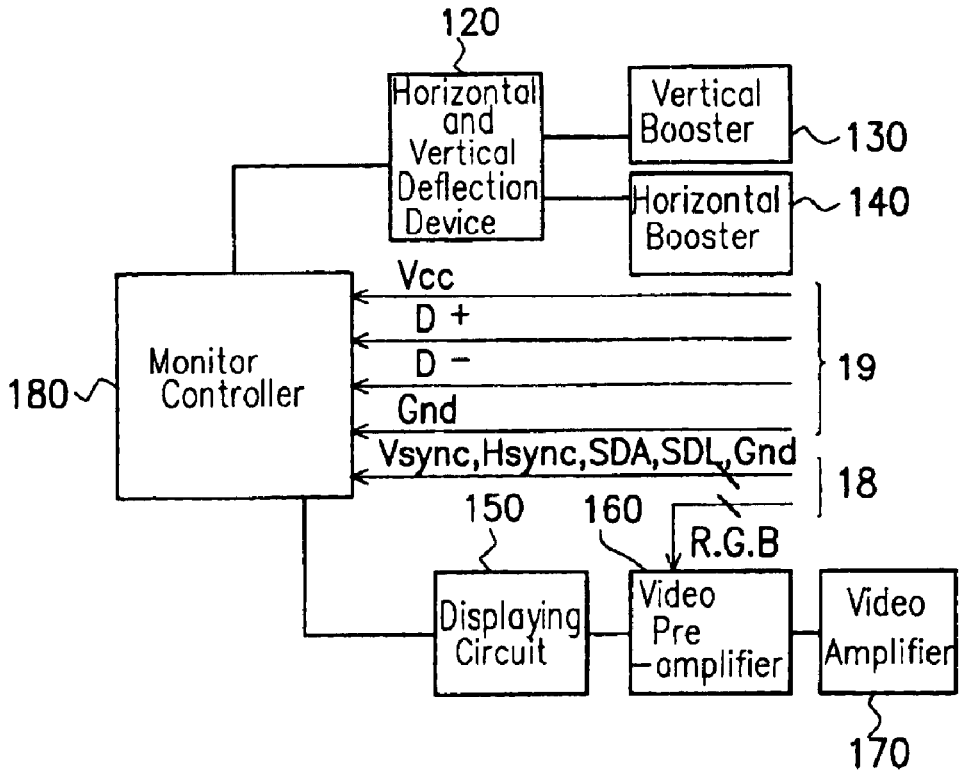
FIG. 4 is a block circuit diagram of a monitor according to the invention.

Referring to FIG. 4, a monitor according to the invention is shown. VGA signal lines 18 and USB signal lines 19 are electrically coupled to a monitor controller 180 having a monitor in system programming ROM (not shown). According to a received signal and a program stored in the ROM, a horizontal and vertical deflection device 120 can be drove to control a vertical booster 130 and a horizontal booster 140 for CRT horizontal and vertical control.

When it is necessary to modify the function of the monitor system, data stored in the ROM of the monitor controller 180 needs to be updated. Compared to the prior art, it is unnecessary to open the case of the monitor. In other words, the function update of the monitor can be achieved by just using the USB signal lines 19.

Figure 5:
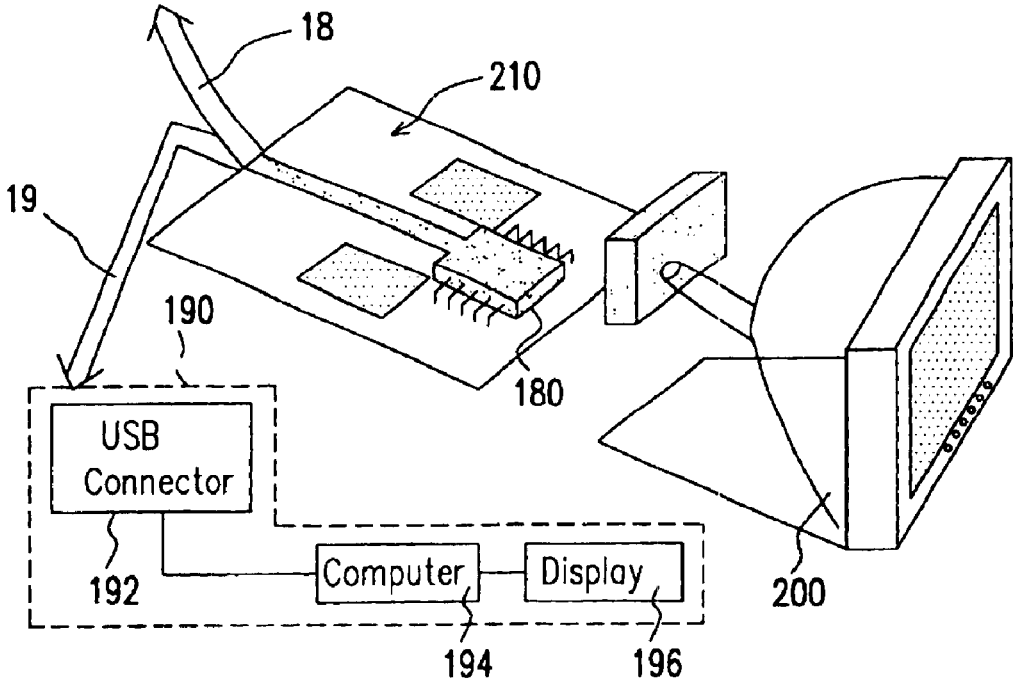
FIG. 5 is a schematic view of a system for updating the function of a monitor using a USB interface according to the invention.

FIG. 5 shows a system for updating the function of a monitor using a USB interface according to the invention. On a printed circuit board 210 of a monitor 200, USB signal lines 19 are electrically coupled to a recording device 190. First, a recording command and data are written into a computer 194. Thereafter, the recording command and data are converted into a form of USB, and then written into the ROM of a monitor controller 180 via the USB signal lines 19 from a USB connector 192.

The recording device 190 can also be replaced by a USB interface circuit stage. Similarly, a recording command and data are written into the memory region of the USB interface circuit stage. Then, the recording command and recorded data are written into the monitor controller 180 directly in a form of USB via the USB signal lines 19 for data update.

In detail, the D+, D− signal lines of the USB signal lines 19 are used to transmit the recording command and data in a form of USB.

Figure 1:
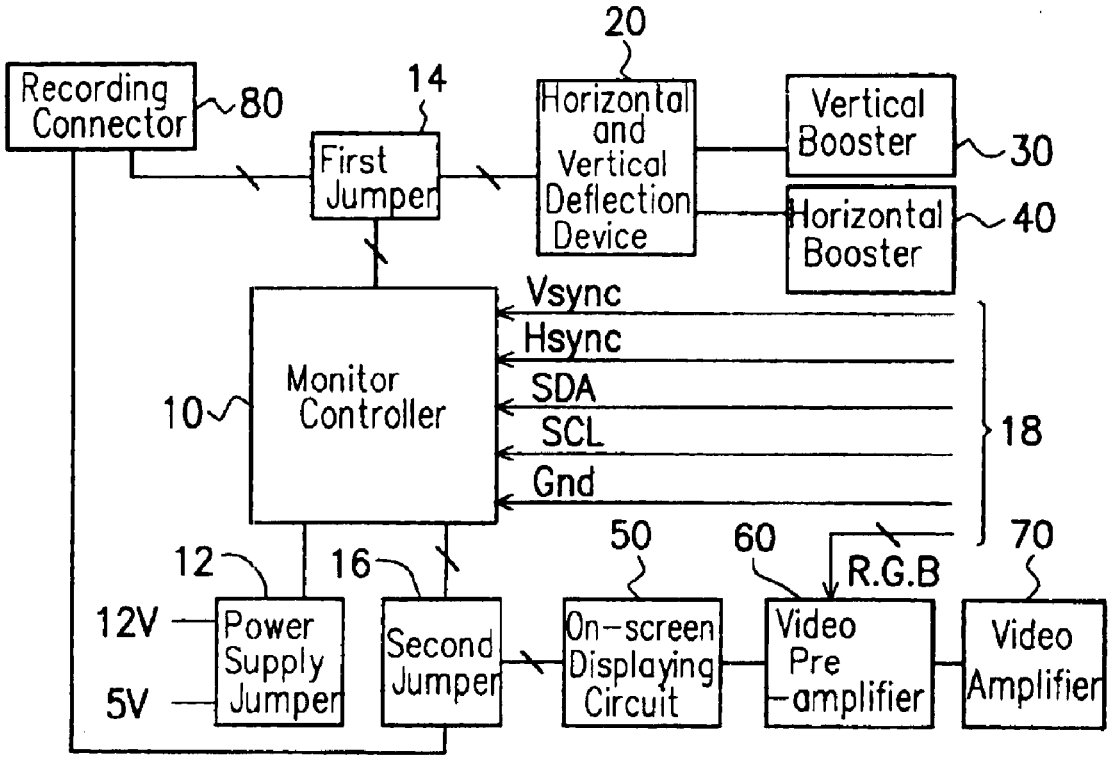
FIG. 1 (PRIOR ART)
FIG. 1 is a block circuit diagram of a conventional monitor.
Figure 2:
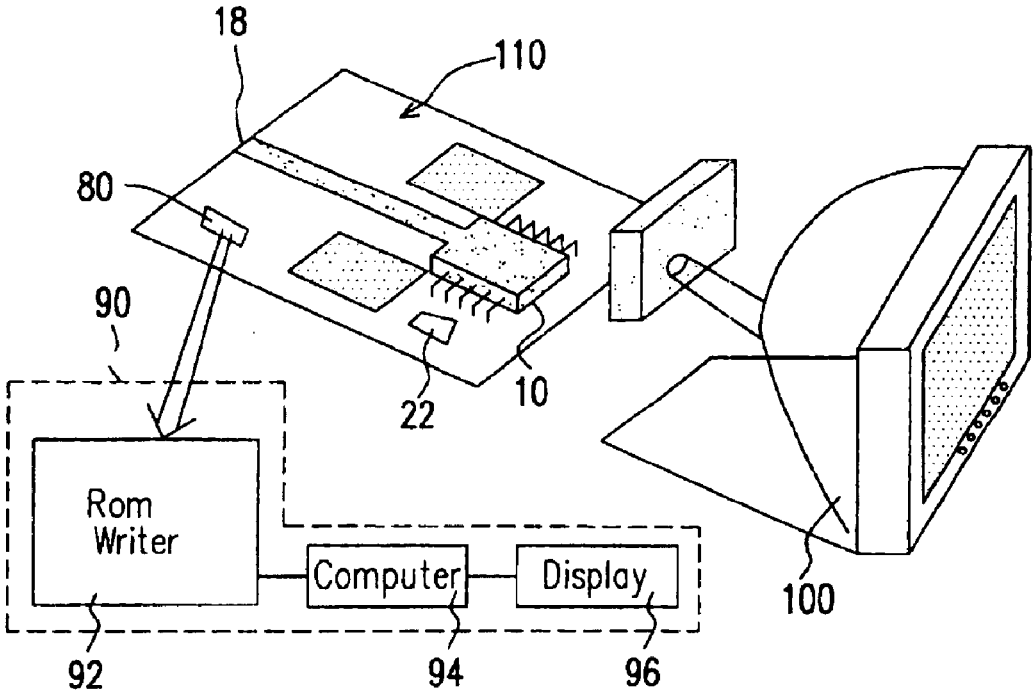
FIG. 2 (PRIOR ART)
FIG. 2 is a schematic view of a conventional system being able to update the function of a monitor.
Figure 3:
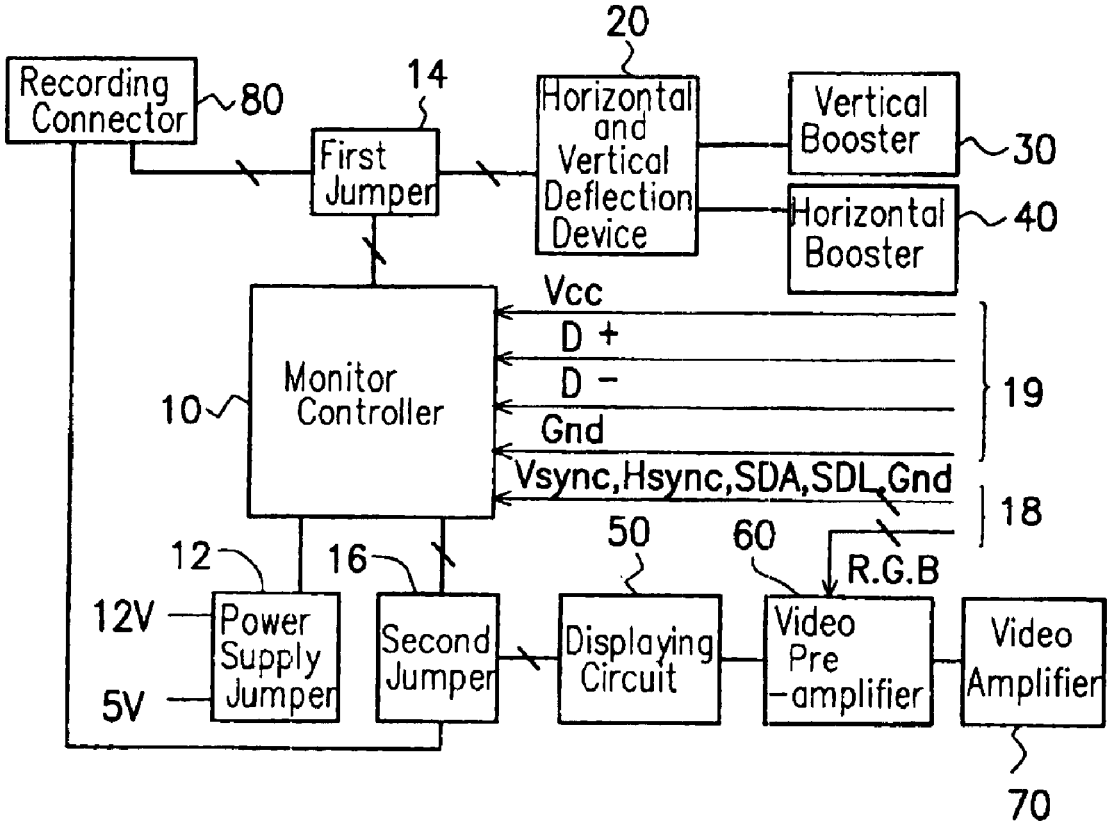
FIG. 3 (PRIOR ART)
FIG. 3 is a block circuit digram of a monitor system having USB signal lines.
Figure 6:
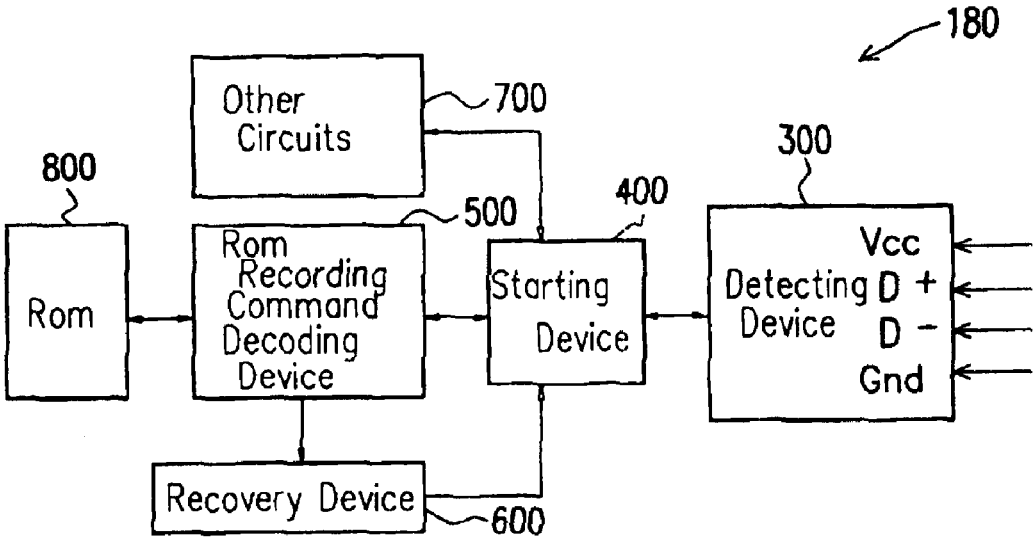
FIG. 6 is a block circuit diagram showing a monitor controller of FIG. 3.

Referring to FIG. 6, the monitor controller 180 of FIG. 3 is shown. The monitor controller 180 includes a detecting device 300, a starting device 400, a ROM recording command decoding device 500, a recovery device 600, a ROM 800 and other circuits 700.

The detecting device 300 is electrically coupled to the USB signal lines 19 for detecting whether the recording command and data are transmitted from the USB signal lines 19. If detected, a corresponding signal is sent to the starting device 400.

The starting device 400 has a visual path and a recording path. When recording is performed, the recording command and recorded data are transmitted to the ROM recording command decoding device 500 via the recording path from the starting device 400. In a normal condition, general visual data are transmitted to other circuits 700 by switching the starting device 400 to the visual path for display.

The ROM recording command deciding device 500 is used to convert the recording command into an erase/read/write signal and the recorded data into an address signal and a data signal. Then, the address signal, the data signal and the erase/read/write signal are transmitted to the ROM 800 for data update.

The ROM 800 is a flash ROM or an electrically erasable programmable ROM (EPROM). Data stored in the ROM 800 is used for updating the function of the monitor. According to the received address signal, data signal and erase/read/write signal, data update of the ROM 800 can be achieved.

The recovery device 600 is electrically coupled to the ROM recording command decoding device 500 and the starting device 400 and is used to determine whether the data update is completely achieved. After the data update is completely achieved, the starting device 400 is switched to the recording path from the visual path.

Figure 7:
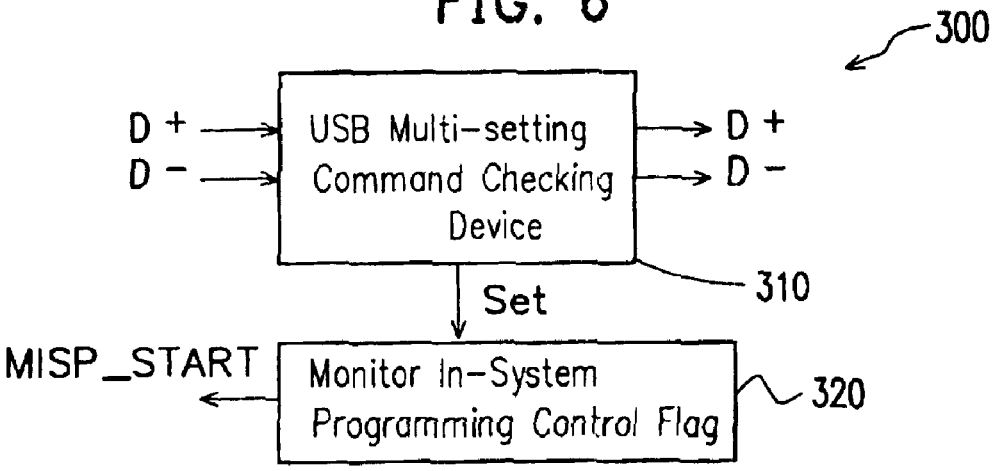
FIG. 7 is a block circuit diagram showing a detecting device of FIG. 6.

Next, each device will be described in detail as follows:

Referring to FIG. 7, the block circuit diagram of the detecting device 300 of FIG. 6 is shown. A USB multi-setting command checking circuit 310 of the detecting device 300 is used to check serial setting commands on the data signal lines D+, D−. After determining that the serial setting commands are correct, a setting signal is sent to a monitor in-system programming control flag 320. When the monitor in-system programming control flag 320 receives the setting signal, recording is formally performed and meanwhile a monitor in-system programming start signal is sent to the starting device 400, in a monitor in-system programming mode.

Figure 8:
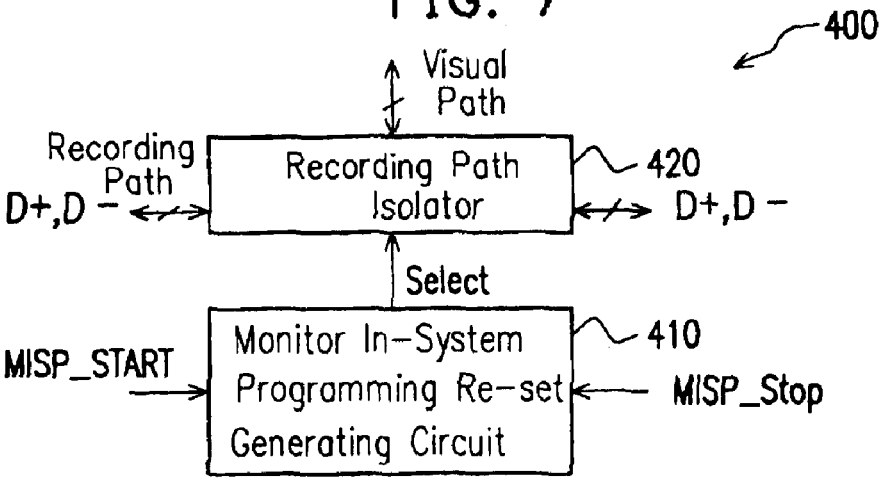
FIG. 8 is a block circuit diagram showing a starting device of FIG. 6.

Referring to FIG. 8, the starting device 400 of FIG. 6 is shown. When a monitor in-system programming reset generator 410 receives a monitor in-system programming starting (MISP_START) signal, a selecting signal is generated and transmitted to a recording path separator 420 to switch the recording path separator 420 to the recording path from the visual path. Then, the recording command and the recorded data are sent out via the recording path.

Figure 9:
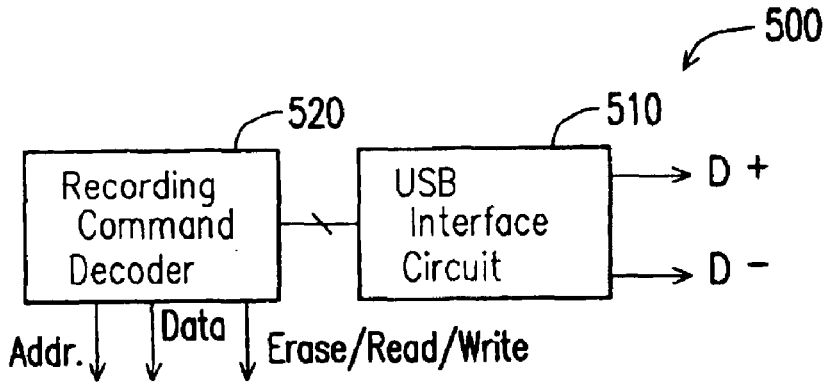
FIG. 9 is a block circuit diagram showing a ROM recording command decoding device of FIG. 6.

Referring to FIG. 9, the ROM recording command decoding device 500 of FIG. 6 is shown. A USB interface circuit of the ROM recording command decoding device 500 receives the recording command and the recorded data coming from the starting device 400 and then converts them into another recording command and recorded data compatible to a recording command decoder 520. The recording command decoder 520 receives the converted recording command and recorded data and further converted them into an address signal and a data signal and an erase/read/write signal. Then, the address signal, data signal and erase/read/write signal are sent to the ROM 800 to achieve data update.

Figure 10:
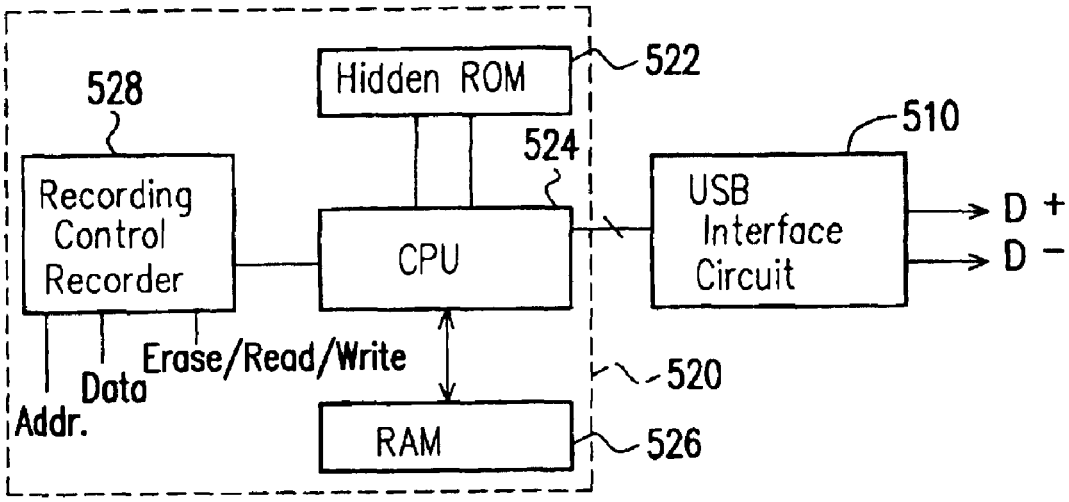
FIG. 10 is a block circuit diagram showing a recording command decoder of FIG. 9.

Referring to FIG. 10, the recording command decoder 520 of FIG. 9 is shown. The recording command decoder includes a hidden ROM 522, a RAM 526, a CPU 524 and a recording control recorder 528.

The hidden memory 522 is used to store the program codes of the recording command. The RAM 526 can access the recorded data. The CPU 524 receives the USB interface circuit-converted recording command and recorded data and then store them in the RAM 526. The recording command are decoded according to the program codes of the hidden ROM 522 and then transmits them to the recording control recorder 528. When receiving the decoded recording command, the recording control recorder 528 converts them into an interface control signal, namely, the erase/read/write signal. Thereafter, the recorded data stored in the RAM 526 are converted into an address signal and a data signal by the CPU 524.

The recording command decoder 520 can be replaced with a hardware circuit. Similarly, a recording command received by the USB circuit can be decoded by dividing them into various states. And, the recording command and the recorded data are converted into an erase/read/write signal, an address signal and a data signal.

Figure 11:
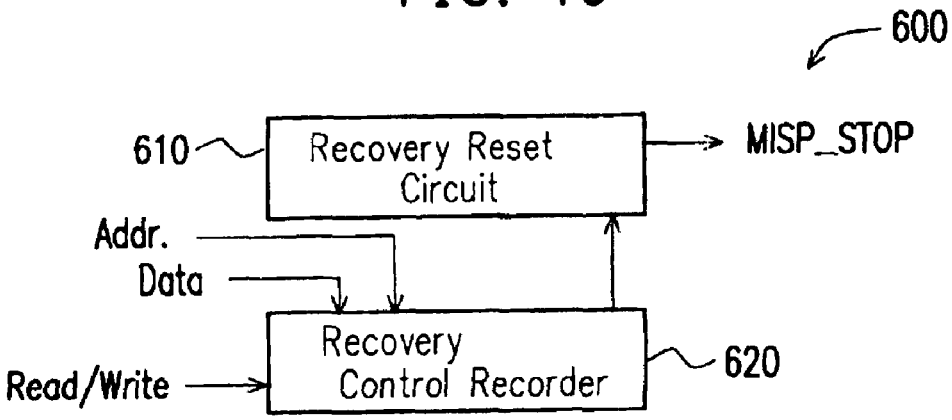
FIG. 11 is a block circuit diagram showing a recovery device of FIG. 6.

Referring to FIG. 11, the recovery device 600 of FIG. 6 is shown. In FIG. 6, a recovery control recorder 620 receives the address signal, the data signal and the read/write signal and transmits a recovery signal to a recovery reset circuit 610 after recording is achieved. When the recovery reset circuit 610 receives the recovery signal, it sends a monitor in-system programming stop (MISP_STOP) signal to the starting device 400, thereby switching the starting device 400 from the recording path to the visual path.

Figure 12:
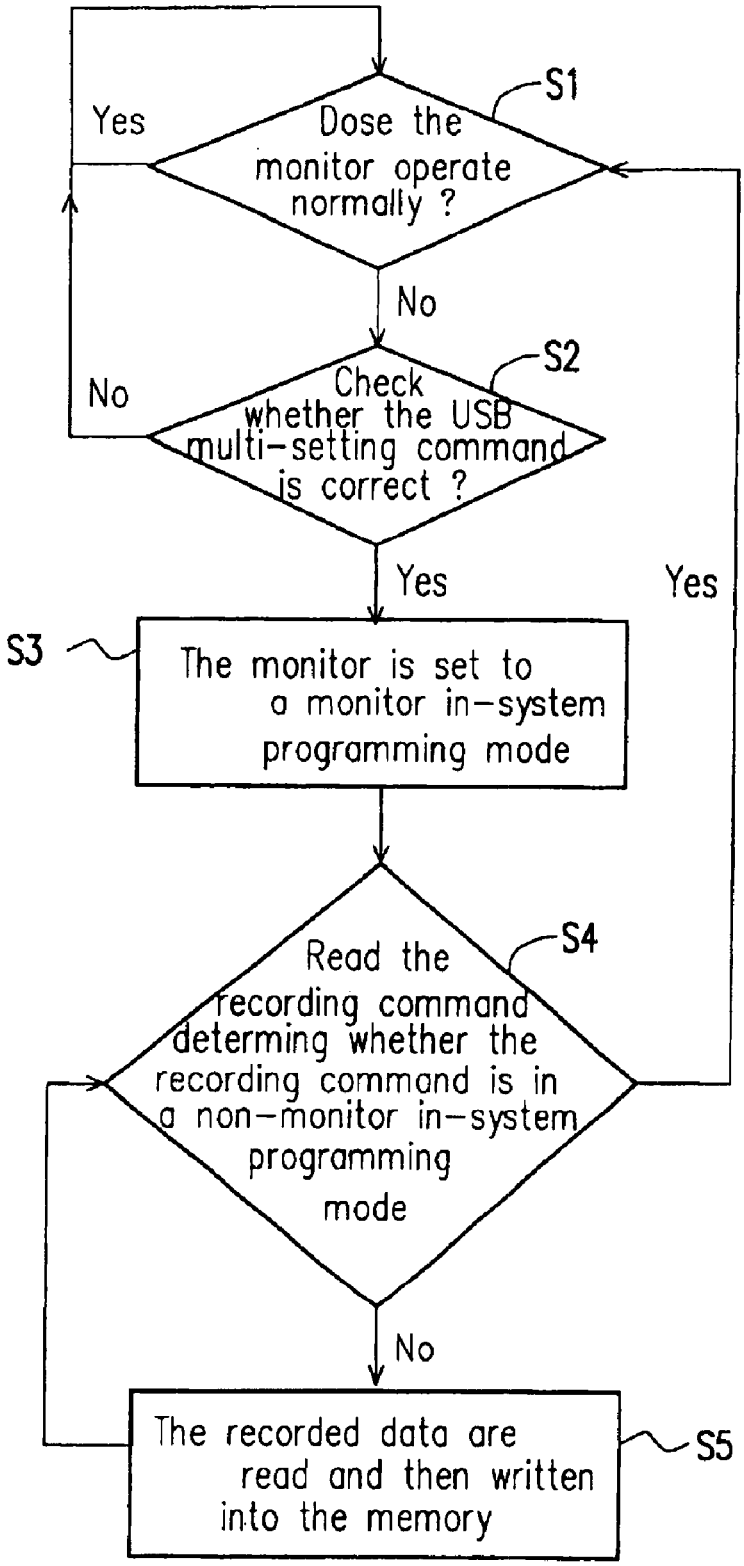
FIG. 12 is a flow chart showing a method for updating the function of a monitor according to the invention.

A method for updating the function of a monitor according to the invention shown in FIG. 12 will be described in the following.

First, in Step 1, whether a monitor operates normally is detected. If the monitor operates normally, Step 1 is continuously performed.

When the monitor operates abnormally, Step 2 is performed to determine whether the signals on the USB signal lines are correct by a USB multi-setting command check. If the USB multi-setting command is incorrect, the process returns to Step 1. If the USB multi-setting command is correct, Step 3 is performed to set the monitor to a monitor in-system programming mode.

Next, Step 4 is performed to read a recording command and determine whether the recording command is in a non-monitor in-system programming mode. When the recording command is a write command, the recording command is read and then written into a memory, and the recording command is re-read. If the recording command is in a non-monitor in-system programming mode, go to step 1 to detect whether the monitor operates normally.

Accordingly, the invention is to provide a device and a method for updating the function of a monitor. By using the USB signal lines directly for data transmission and recording the data of the monitor controller to the erasable programmable read only memory, data update can be achieved.

While the invention has been described by way of example and in terms of the preferred embodiment, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A device [installed in] *of* a monitor system for updating the function of a monitor of the monitor system, comprising:

[USB signal lines] *a serial interface* for transmitting *serial information, the serial information comprises* a recording command and recorded data;

a detecting device [electrically] coupled to the [USB signal lines] *serial interface* for detecting and [outputting] *transmitting* the recording command and the recorded data;

a starting device [electrically] coupled to the detecting device for receiving the recording command and the recorded data and then transmitting the recording command and the recorded data when the starting device is switched from a visual path to a recording path;

a [ROM recording command decoder] *command decoder connected to the starting device* for converting the recording command into a [erase/read/write signal] *recording signal* and the recorded data into [a] *an* address signal and a data signal by switching the starting device to the recording path;

a ROM [electrically] connected to the [ROM recording] command decoder, [of which] the data *of the ROM* can be updated according to the *recording signal,* the address signal[.] *and* the data signal [and the erase/read/write signal]; and a recovery device [electrically] coupled to [the ROM recording command decoder] *the command decoder* and the starting device [determining whether the data stored in the ROM are already updated according to the address signal, the data signal and the read/write signal and for switching the starting device from the recording path to the visual path when the data of the ROM are already updated] for *switching the starting device according to the recording signal, the address signal or the data signal, the starting device is switching from the recording path to the visual path after the data of the ROM is already updated.*

2. The device for updating the function of a monitor as claimed in claim 1, wherein the [USB signal] *serial interface* is [electrically] coupled to a recording device for transmitting the recording command and the recorded data.

3. The device for updating the function of a monitor as claimed in claim 2, wherein the recording device is a computer stage for transmitting the recording command and the recorded data through a [USB in a form of USB] *serial interface*.

4. The device for updating the function of a monitor as claimed in claim 2, wherein the recording device is a USB interface circuit stage for transmitting the recording command and the recorded data in a form of USB.

5. The device for updating the function of a monitor as claimed in claim 1, wherein the detecting device comprises:

a [USB multi-address checking circuit electrically coupled to the USB signal lines] *serial checking circuit coupled to the serial interface* for checking a serial setting commands of [the recorded data] *the serial information* and then transmitting a setting signal when the checked serial setting commands are correct; and a monitor in-system programming (MISP) flag electrically coupled to the [USB multi-address] *serial* checking circuit for transmitting a monitor in-system programming starting signal according to the setting signal.

6. The device for updating the function of a monitor as claimed in claim 1, wherein the starting device comprises:

a monitor in-system programming reset generating circuit for generating a selecting signal [according to the monitor in-system programming starting signal]; and a recording path separator *which* switched from the visual path to the recording path [according to the selecting signal and transmitting the recording command and the recorded data via the recording path]*, or from the recording path to the visual path according to the selecting signal*.

7. The device for updating the function of a monitor as claimed in claim 1, wherein the [ROM recording command decoding device] *command decoder* comprises:

a [USB interface circuit] *serial interface circuit* for receiving and converting the recording command and the recorded data; and a recording command decoder for receiving the converted recording command and the [recording] *recorded* data and transmitting the [address] *recording* signal, the [data] *address* signal and the [erase/read/write] *data* signal.

8. The device for updating the function of a monitor as claimed in claim 7, wherein the recording command decoder comprises:

a hidden ROM for storing the program codes of the recording command;

a RAM for storing the [recording] *recorded* data;

a CPU [electrically] coupled to the hidden ROM, the RAM and the [USB] *serial* interface circuit for receiving the [USB] *serial* interface circuit-converted recording command and recorded data, storing the recorded data in the RAM, decoding the recording command according to the program code of the hidden ROM and then sending the decoded recording command; and a recording control recorder [electrically] coupled to the CPU for receiving the decoded recording command and converting the decoded recording command into an erase/read/write signal and sending the recorded data stored in the RAM according to the address signal and the data signal.

9. The device for updating the function of a monitor as claimed in claim 7, wherein the function of the recording command decoder can be achieved by a hardware circuit which can divide the recording command received by the [USB] *serial interface* circuit into a plurality of states to perform the function of decoding and convert the recording command and the recorded data into the [erase/read/write] *recording* signal, the address signal and the data signal.

10. The device for updating the function of a monitor as claimed in claim 1, wherein the recovery device further comprises:

a recovery control recorder for receiving the address signal, the data signal and the [erase/read/write] *recording* signal and transmitting a recovery signal after recording is achieved; and a recovery reset circuit [electrically] coupled to the recovery control recorder and the starting device for transmitting a monitor in-system programming stop signal to switch the starting device from the recording path to the visual path when receiving the recovery signal.

11. The device for updating the function of a monitor as claimed in claim 1, wherein the ROM is a flash ROM.

12. The device for updating the function of a monitor as claimed in claim 1, wherein the ROM is an electrically erasable programmable read only memory.

13. A system for updating the function of a monitor, comprising:

a recording device for storing and outputting a recording command and recorded data;

[USB signal lines electrically] *a serial interface* coupled to the recording device for transmitting the recording command and the recorded data; and a monitor controller having a monitor in system programming memory, [electrically] coupled to the [USB signal lines] *serial interface*, wherein if a setting command of the recorded data from the [USB signal lines] *serial interface* is correct, the monitor controller is modified according to the recording command and the recorded data, wherein the [USB signal lines] *serial interface* and the monitor controller are installed in a monitor system.

14. The system for updating the function of a monitor as [claim] *claimed* in claim 13, wherein the recording device is a computer stage for transmitting the recording command and the recorded data [in a form of USB via a USB connector] *through the serial interface*.

15. The system for updating the function of a monitor as claimed in claim 13, the recording device is a [USB] *serial* interface circuit stage for transmitting the recording command and the recorded data in a [form of USB] *serial form*.

16. The system for updating the function of a monitor as claimed in claim 13, wherein the monitor controller further comprises:

a detecting device [electrically] coupled to [the USB signal lines] *the serial interface* for detecting and outputting the recording command and the recorded data;

a starting device [electrically] coupled to the detecting device for receiving the recording command and the recorded data and then transmitting the recording command and the recorded data when the starting device is switched from a visual path to a recording path;

a [ROM recording command decoder] *command decoder connected to the starting device* for converting the recording command into a [erase/read/write] *recording* signal and the recorded data into [a] *an* address signal and a data signal by switching the starting device to the recording path[;]*, and the command decoder also connected to the monitor in system programming memory for updating the monitor in system programming memory according to the address signal, the data signal and the recording signal; and*

[a ROM electrically connected to the ROM recording command decoder, of which data can be updated according to the address signal, the data signal and the erase/read/write signal; and]

a recovery device [electrically] coupled to the [ROM recording] command decoder and the starting device for [determining whether the data stored in the ROM are already updated according the address signal, the data signal and the read/write signal and for switching the starting device from the recording path to the visual path when the data of the ROM are already updated] *switching the starting device according to the recording signal, the data signal or the address signal, the starting device is switching from the recording path to the visual path after the data of the monitor in system programming memory is already updated.*

17. The system for updating the function of a monitor as claimed in claim 16, wherein the detecting device further comprises:

a [USB] multi-address *serial* checking circuit [electrically] coupled to the [USB signal lines] *serial interface* for checking the setting command of the recorded data and then transmitting a setting signal when the checked [the] setting command is correct; and a monitor in system programming (MISP) flag [electrically] coupled to the [USB multi-address] *serial* checking circuit for setting the monitor to a monitor [in-system] *in system* programming control mode according to the setting signal and transmitting a monitor [in-system programming] *in system programming* starting signal.

18. The system for updating the function of a monitor as claimed in claim 16, wherein the starting device further comprises:

a monitor [in-system] *in system* programming reset generating circuit for generating a selecting signal according to the monitor [in-system] *in system* programming starting signal; and a recording path separator switched from the visual path to the recording path according to the selecting signal and transmitting the recording command and the recorded data via the recording path.

19. The system for updating the function of a monitor as claimed in claim 16, wherein [the ROM recording command decoding device] *the command decoder* comprises:

a [USB] *serial* interface circuit for receiving and converting the recording command and the recorded data; and a recording command decoder for receiving the converted recording command and the [recording] *recorded* data and transmitting the address signal, the data signal and the [erase/read/write] *recording* signal.

20. The system for updating the function of a monitor as claimed in claim 19, wherein the recording command decoder comprises:

a hidden ROM for storing the program codes of the recording command;

a RAM for storing the recording data;

a CPU [electrically] coupled to the hidden ROM, the RAM and the [USB] *serial* interface circuit for receiving the [USB] *serial* interface circuit-converted recording command and recorded data, storing the recorded data in the RAM, decoding the recording command according to the program code of the hidden ROM and then sending the decoded recording command; and a recording control recorder [electrically] coupled to the CPU for receiving the decoded recording command and converting the decoded recording command into [an erase/read/write] *the recording* signal and sending the recorded data stored in the RAM according to the address signal and the data signal.

21. The system for updating the function of a monitor as claimed in claim 19, wherein the function of the recording command decoder can be achieved by a hardware circuit which can divide the recording command received by the [USB] *serial interface* circuit into a plurality of states to perform the function of decoding and convert the recording command and the recorded data into the [erase/read/write] *recording signal*, the address signal and the data signal.

22. The system for updating the function of a monitor as claimed in claim 16, wherein the recovery device further comprises:

a recovery control recorder for receiving the address signal, the data signal and the [erase/read/write] *recording* signal and transmitting a recovery signal after recording is achieved; and a recovery reset circuit [electrically] coupled to the recovery control recorder and the starting device for transmitting a monitor [in-system] *in system* programming stop signal to switch the starting device from the recording path to the visual path when receiving the recovery signal.

23. The system for updating the function of a monitor as claimed in claim [16] *13*, wherein the [ROM] *monitor in system programming memory* is a flash ROM.

24. The system for updating the function of a monitor as claimed in claim [16] *13*, wherein the [ROM] *monitor in system programming memory* is an electrically erasable programmable read only memory.

25. A method for updating the function of a monitor, comprising:

receiving a plurality of signals from [a plurality of USB signal lines] *a serial interface port* by the monitor;

checking [if] serial setting commands of the signals [are correct] by a monitor controller installed in the monitor, if the serial setting commands of the signals are correct, the signals from [the USB signal lines] *the serial interface port* are transmitted to the monitor controller by switching a transmitting path of the signals from [the USB signal lines] *the serial interface port* from a visual path to a recording path, and the monitor controller is modified [and updated] according to the signals from [the USB signal lines] *the serial interface port*; and determining [if] *whether the modification of* the monitor controller is [completely] achieved, [the signals from the USB signal lines are transmitted by the transmitting path of the signals from the USB signal lines from the recording path to the visual path] *if the modification of the monitor controller is achieved, the transmitting path of the signals is switched from the recording path to the visual path.*

26. The method of updating the function of a monitor of claim 25, wherein the step of checking [if] the serial setting commands of the signals [are correct] by [a] *the* monitor controller comprising checking if the monitor operates normally, if the monitor operates abnormally, performing a [USB multi-setting] *serial* command check process upon the signals from the [USB signal lines] *serial interface port*.

27. The method for updating the function of a monitor of claim 25, wherein the signals from the [USB signal lines] *serial interface port* includes recording commands and recorded data for [updating] *modifying* the monitor controller, wherein the recording commands are converted into an erase/read/write signal and the recorded data is converted into an address signal and a data signal, the monitor controller [are updated] *is modified* with the erase/read/write signal, the address signal and the data signal in order to update the function of the monitor.

*28. A device of a display for updating the function of the display, comprising:*

*a serial interface for receiving a serial information from a recording device, wherein the serial information comprises a recording command and recorded data in a serial form; and*

*a display controller having a non-volatile memory, coupled to the serial interface, wherein if a setting command of the serial information from the serial interface is correct, the display controller is modified according to the recording command and the recorded data, wherein the serial interface and the display controller are installed in the display.*

*29. The device for updating the function of the display as claimed in claim 28, wherein the recording device is a computer stage for transmitting the recording command and recorded data through the serial interface.*

*30. The device for updating the function of the display as claimed in claim 28, wherein the recording device is a serial interface circuit stage for transmitting the recording command and the recorded data in a serial form.*

*31. The device for updating the function of the display as claimed in claim 28, wherein the display controller further comprises:*

*a detecting device coupled to the serial interface for detecting and outputting the recording command and the recorded data;*

*a starting device coupled to the detecting device for receiving the recording command and the recorded data and then transmitting the recording command and the recorded data when the starting device is switched from a visual path to a recording path;*

*a command decoder connected to the starting device for converting the recording command into a recording signal and the recorded data into an address signal and a data signal by switching the starting device to the recording path, and the command decoder also connected to the non-volatile memory for updating the non-volatile memory according to the address signal, the data signal and the recording signal; and*

*a recovery device coupled to the command decoder and the starting device for switching the starting device according to the recording signal, the data signal or the address signal, the starting device is switching from the recording path to the visual path after the data of the non-volatile memory is already updated.*

*32. The device for updating the function of the display as claimed in claim 31, wherein the detecting device further comprises:*

*a serial checking circuit coupled to the serial interface for checking the setting command of the serial information and then transmitting a setting signal when the checked setting command is correct; and*

*a display in system programming flag coupled to the serial checking circuit for setting the display to a display in system programming control mode according to the setting signal and transmitting a display in system programming starting signal.*

*33. The device for updating the function of the display as claimed in claim 31, wherein the starting device further comprises:*

*a display in system programming reset generating circuit for generating a selecting signal according to the display in system programming starting signal; and*

*a recording path separator switched from the visual path to the recording path according to the selecting signal and transmitting the recording command and the recorded data via the recording path.*

*34. The device for updating the function of the display as claimed in claim 31, wherein the command decoder comprises:*

*a serial interface circuit for receiving and converting the recording command and the recorded data; and*

*a recording command decoder for receiving the converted recording command and the recorded data and transmitting the address signal, the data signal and the recording signal.*

*35. The device for updating the function of the display as claimed in claim 34, wherein the recording command decoder comprises:*

*a hidden ROM for storing the program codes of the recording command;*

*a RAM for storing the recording data;*

*a CPU coupled to the hidden ROM, the RAM and the serial interface circuit for receiving the serial interface circuit-converted recording command and recorded data, storing the recorded data in the RAM, decoding the recording command according to the program code of the hidden ROM and then sending the decoded recording command; and*

*a recording control recorder coupled to the CPU for receiving the decoded recording command and converting the decoded recording command into the recording signal and sending the recorded data stored in the RAM according to the address signal and the data signal.*

*36. The device for updating the function of the display as claimed in claim 31, wherein the recovery device further comprises:*

*a recovery control device for receiving the address signal, the data signal and the recording signal and transmitting a recovery signal after recording is achieved; and*

*a recovery reset circuit coupled to the recovery control device and the starting device for transmitting a display in system programming stop signal to switch the starting device from the recording path to the visual path when receiving the recovery signal.*

*37. The device for updating the function of the display as claimed in claim 28, wherein the serial interface is a USB interface.*

*38. The device for updating the function of the display as claimed in claim 28, wherein the non-volatile memory is a flash ROM.*

*39. The device for updating the function of the display as claimed in claim 28, wherein the non-volatile memory is an electrically erasable programmable read only memory.*

* * * * *